May 27, 1958  G. KINDELL  2,836,278
RETRACTABLE ROLLERS FOR TRUCK BEDS AND BUNKS
Filed Dec. 10, 1956
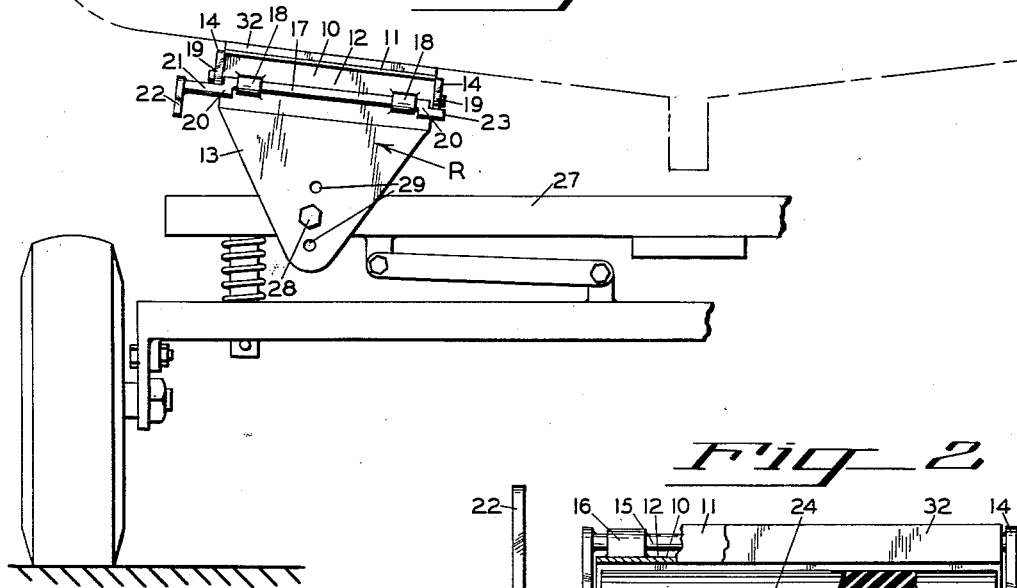
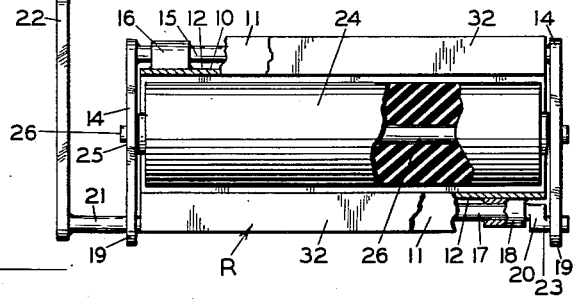
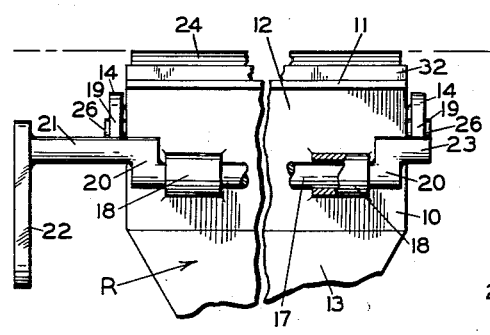
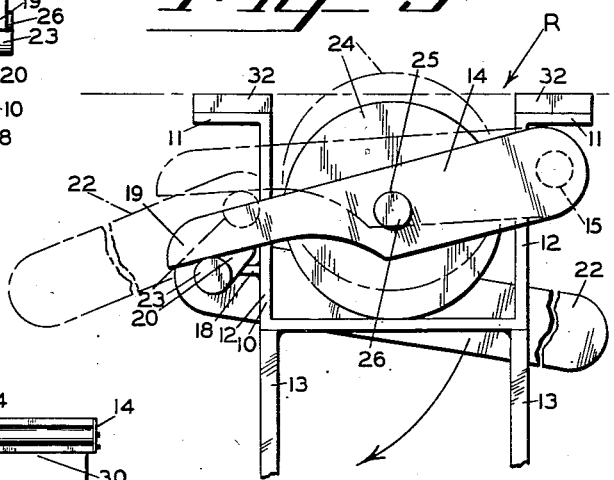
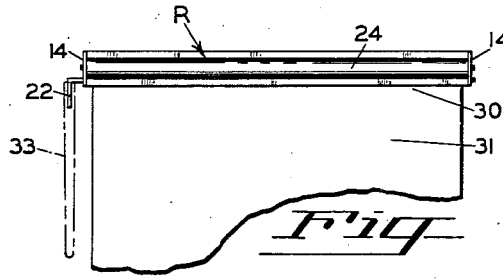
INVENTOR.
GAROLD KINDELL
BY Kimmel & Crowell
ATTORNEYS

United States Patent Office 2,836,278
Patented May 27, 1958

2,836,278

RETRACTABLE ROLLERS FOR TRUCK BEDS AND BUNKS

Garold Kindell, Eugene, Oreg.

Application December 10, 1956, Serial No. 627,448

2 Claims. (Cl. 193—42)

The present invention relates to retractable rollers for truck beds and bunks, and more particularly to such a device which is adapted to be used in connection with bunks on boat trailers.

The primary object of the invention is to provide a retractable roller for moving loads or objects over truck beds or bunks, and for loading or unloading the same, so constructed as to be retractable from under the load, permitting the load to rest on a solid support associated with the roller assembly.

A further object of this invention is to provide a retractable roller supported so as to adjust itself to the contour of the load, as for instance the bottom of a boat being transported on a trailer.

A further object of the invention is to provide a retractable roller having mechanism associated therewith that will raise or lower the load from a rolling position to a stationary position without the use of outside raising or lowering mechanism.

Other objects and advantages will become apparent in the following specification when considered in the light of the attached drawings, in which:

Figure 1 is a front elevation of the invention attached to a boat trailer, partly broken away for convenience of illustration.

Figure 2 is a plan view of the invention, partly broken away.

Figure 3 is an end elevation of the invention illustrating the roller in retracted position.

Figure 4 is a fragmentary side view of the invention illustrating the roller in raised position, parts broken away for convenience of illustration.

Figure 5 is a plan view of a modified form of roller to be used in connection with truck beds, showing the operating handle in broken line position.

Referring now to the drawings in detail wherein like reference characters indicate like parts throughout the several figures, the reference character R indicates generally a retractable roller assembly which includes an inverted channel member 10 having upper edges 11 on channel legs 12 bent to a horizontal plane, referring particularly to Figure 3. Downwardly extending legs 13 are secured to the channel member 10 and support the roller assembly when used as illustrated in Figure 1.

In the case of truck beds and the like, the channel 10 is secured to the bed of the truck directly by any suitable means. A pair of arms 14 are fixedly connected to a cross shaft 15, referring to Figure 2, which in turn is journalled within bearings 16 carried by the channel member 10.

A transverse cam shaft 17 is journalled within bearings 18 on the opposite side of the channel 10, and supports the ends 19 of the arms 14. The shaft 17 has offset cams 20 forming part thereof. The shaft 17 continues at one end beyond the channel member 10, as indicated by numeral 21.

A crank 22 may be either fixedly secured thereto or removably mounted, depending upon the use to which the retractable roller R is being used. The opposite end of the shaft 17 extends beyond the crank 20 and carries an offset shaft 23 thereon for supporting along with the portion 21 the outer ends 19 of the oppositely disposed arms 14.

A roller 24 is journalled within bearings 25 on the arms 14 at both of its ends. The roller 24 may be of a resilient material, having a central shaft 26 as would be used in connection with boat trailers, or it could be a solid metallic roller if used in connection with beds or trucks and the like for hauling lumber.

The roller assembly R, in the case of boat trailers, is pivotally mounted to the bunk 27 of the trailer by its downwardly extending legs 13 and a pivot pin 28 extending therethrough. The pivot pin 28 passes through one set of the holes 29 in the legs 13. There is more than one hole 29 in order to adjust the elevation of the roller assembly R.

In the case of a truck bed 31, the roller assembly R may be embedded within the bed 31 of the truck, or it may be secured to the end 30 of the truck bed 31, as best illustrated in Figure 5 by any suitable means, as for instance bolts or the like.

Resilient pads 32 are fixedly secured to the horizontal upper edges 11 of the channel member 10 for supporting the load to be carried.

In the operation of this new and improved retractable roller mechanism R, in the case of boat trailers, the lever 22 is rotated from the position shown in Figures 1, 2 and 3, to the position shown in Figure 4, or as indicated by broken lines in Figure 3, when it is desired to either load or unload the boat from the trailer. This raises the roller 24, allowing the bottom of the boat to roll over the roller 24 in the loading or unloading operation. The pivot pin 28 permits the roller assembly R to assume the proper position, causing the hull of the boat to rest over the entire length of the roller 24.

When the hull of the boat has reached the desired position, the lever 22 is rotated to the full line position, shown in Figures 1, 2 and 3, which allows the ends 19 of the arms 14 to drop to their lower position, retracting the roller 24 as shown, permitting the hull of the boat to rest on the pads 32. The pads 32 support the weight of the load of the boat and help to prevent the same from moving forward or backward.

In the case of truck beds as used in the carrying of lumber and the like, a removable lever 33, indicated by broken lines, may be employed, as considerable leverage may be necessary for raising the roller 24, as the entire load must be raised or lowered.

In the use of this new and improved retractable roller R the slipping of the load over the surface of the truck beds 31 and the like has been eliminated, especially when a resilient pad 32 is used in connection with the assembly R and the roller 24 has been completely removed from under the load. The starting and stopping of the truck will not cause the load to shift.

Having thus described the preferred embodiment of the invention, it should be understood that numerous structural modifications and adaptations may be resorted to without departing from the scope of the appended claims.

What is claimed is:

1. A load support comprising a channel member including a pair of upright spaced parallel legs integrally connected at their lower ends, a pair of flanges integrally connected to the upper ends of said legs and extending perpendicularly outwardly therefrom, a resilient load engaging pad fixed to each of said flanges, a pair of spaced parallel arms arranged at opposite ends of said channel member, means pivotally securing one end of said arms to one of said legs, a shaft journalled on the other of said legs, eccentric extensions integrally formed on each end of said shaft, said eccentric extensions supporting the other ends of said arms, a lever fixed to said shaft for rotating said shaft to raise and lower said arms supported on said eccentric extensions, a resilient roller positioned between said legs, and a roller shaft fixed to said roller and having its opposite ends journalled in said arms whereby said roller is selectively raised above said pads to support a load for movement thereon and retracted below said pads to deposit a load on said pads.

2. A device as claimed in claim 1 wherein means are provided for supporting said channel member for pivotal movement on the frame of a vehicle.

References Cited in the file of this patent

UNITED STATES PATENTS

| | | |
|---|---|---|
| 1,658,770 | Murray et al. | Feb. 7, 1928 |
| 2,332,991 | Commire | Oct. 26, 1943 |
| 2,360,133 | Houssiere | Oct. 10, 1944 |
| 2,524,664 | Henderson et al. | Oct. 3, 1950 |
| 2,554,398 | Brei | May 22, 1951 |
| 2,676,716 | Sallis | Apr. 27, 1954 |
| 2,763,384 | Foster | Sept. 18, 1956 |
| 2,788,146 | Gronlund | Apr. 9, 1957 |